(12) United States Patent
Schiff et al.

(10) Patent No.: US 9,396,492 B2
(45) Date of Patent: Jul. 19, 2016

(54) COMPUTER SYSTEM AND METHOD FOR ANALYZING DATA SETS AND PROVIDING PERSONALIZED RECOMMENDATIONS

(75) Inventors: Jeremy Schiff, Portola Valley, CA (US); Corey Reese, Portola Valley, CA (US); Yige Wang, East Palo Alto, CA (US); Scott Goodson, La Honda, CA (US); Paul Kenneth Twohey, Palo Alto, CA (US)

(73) Assignee: OpenTable, Inc., San Francisco, CA (US)

( * ) Notice: Subject to any disclaimer, the term of this patent is extended or adjusted under 35 U.S.C. 154(b) by 10 days.

(21) Appl. No.: 13/274,235

(22) Filed: Oct. 14, 2011

(65) Prior Publication Data
US 2012/0095863 A1 Apr. 19, 2012

Related U.S. Application Data

(60) Provisional application No. 61/393,793, filed on Oct. 15, 2010.

(51) Int. Cl.
G06Q 30/06 (2012.01)
G06Q 30/02 (2012.01)

(52) U.S. Cl.
CPC ........ *G06Q 30/0631* (2013.01); *G06Q 30/0282* (2013.01); *G06Q 30/06* (2013.01)

(58) Field of Classification Search
CPC   G06Q 30/06; G06Q 30/0631; G06Q 30/0282
USPC .............. 705/26.7, 26.1, 14.66, 14.53, 14.68, 705/14.55, 7.31, 1.1, 14.38; 725/109, 110, 725/93, 116; 709/224; 707/732, 749, 802; 348/207.99
See application file for complete search history.

(56) References Cited

U.S. PATENT DOCUMENTS

| | | | |
|---|---|---|---|
| 6,029,195 A * | 2/2000 | Herz | 725/116 |
| 6,370,513 B1 | 4/2002 | Kolawa et al. | |
| 7,610,233 B1 * | 10/2009 | Leong et al. | 705/37 |
| 7,653,761 B2 * | 1/2010 | Juster et al. | 710/18 |
| 7,818,394 B1 | 10/2010 | Lawler et al. | |
| 7,876,214 B1 | 1/2011 | Brady, Jr. | |

(Continued)

OTHER PUBLICATIONS

International Search Report and Written Opinion for PCT/US11/56451, 15 pages, dated Mar. 8, 2012.
European Patent Office, "Search Report" in application No. 12815280.8-1952, dated Jan. 5, 2015, 8 pages.

(Continued)

*Primary Examiner* — Yogesh C Garg
(74) *Attorney, Agent, or Firm* — Hickman Palermo Becker Bingham LLP

(57) ABSTRACT

Embodiments of the invention relate to a computer-implemented method and system for providing personalized recommendations for a target user based at least on stored data about the target user. The method comprises obtaining a plurality of feedback data from a plurality of users, wherein the feedback data comprises an indication of a media object, a response obtained from target user related to the feedback data, and at least one demographic data element associated with the target user. A set of personalized recommendations for the target user are identified based at least on stored data about the target user and the feedback data related to the user. The personalized recommendations system identifies media objects to potentially provide to the target user, and selects or filters the identified media objects to form a set of personalized media objects associated with the set of personalized recommendations.

55 Claims, 8 Drawing Sheets

(56) References Cited

U.S. PATENT DOCUMENTS

| | | | |
|---|---|---|---|
| 7,966,305 B2 | 6/2011 | Olsen | |
| 8,095,432 B1 | 1/2012 | Berman et al. | |
| 8,145,619 B2 | 3/2012 | Bowden et al. | |
| 8,347,211 B1* | 1/2013 | Rogers et al. | 715/716 |
| 8,359,285 B1 | 1/2013 | Dicker et al. | |
| 8,719,198 B2 | 5/2014 | Zheng et al. | |
| 2001/0014868 A1 | 8/2001 | Herz et al. | |
| 2001/0044759 A1 | 11/2001 | Kutsumi | |
| 2002/0161664 A1 | 10/2002 | Shaya et al. | |
| 2006/0200435 A1 | 9/2006 | Finn et al. | |
| 2007/0050192 A1 | 3/2007 | Gutta et al. | |
| 2007/0112761 A1 | 5/2007 | Xu et al. | |
| 2007/0118498 A1 | 5/2007 | Song et al. | |
| 2007/0239702 A1 | 10/2007 | Vassilvitskii et al. | |
| 2007/0250863 A1 | 10/2007 | Ferguson | |
| 2007/0282621 A1 | 12/2007 | Altman et al. | |
| 2008/0104059 A1 | 5/2008 | Segel | |
| 2008/0165255 A1 | 7/2008 | Christie et al. | |
| 2008/0214162 A1 | 9/2008 | Ramer et al. | |
| 2008/0215565 A1 | 9/2008 | Sun et al. | |
| 2008/0244429 A1 | 10/2008 | Stading | |
| 2009/0024605 A1 | 1/2009 | Yang | |
| 2009/0076928 A1 | 3/2009 | Hjertonsson et al. | |
| 2009/0157664 A1 | 6/2009 | Wen | |
| 2009/0177644 A1 | 7/2009 | Martinez et al. | |
| 2009/0204600 A1 | 8/2009 | Kalik et al. | |
| 2009/0222304 A1* | 9/2009 | Higgins et al. | 705/7 |
| 2009/0234664 A1 | 9/2009 | Schaffnit et al. | |
| 2009/0234878 A1 | 9/2009 | Herz et al. | |
| 2009/0248494 A1* | 10/2009 | Hueter et al. | 705/10 |
| 2009/0271246 A1* | 10/2009 | Alvarez et al. | 705/10 |
| 2009/0280860 A1* | 11/2009 | Dahlke | 455/556.1 |
| 2009/0293019 A1 | 11/2009 | Raffel | |
| 2009/0313227 A1* | 12/2009 | Dunning et al. | 707/3 |
| 2010/0023508 A1 | 1/2010 | Zeng et al. | |
| 2010/0076968 A1 | 3/2010 | Boyns et al. | |
| 2010/0177037 A1* | 7/2010 | Kim et al. | 345/156 |
| 2010/0211558 A1 | 8/2010 | Bonbeau et al. | |
| 2010/0217685 A1 | 8/2010 | Melcher et al. | |
| 2010/0227640 A1 | 9/2010 | Kim et al. | |
| 2010/0250336 A1* | 9/2010 | Selinger et al. | 705/10 |
| 2010/0250556 A1 | 9/2010 | Park et al. | |
| 2010/0306229 A1 | 12/2010 | Timm et al. | |
| 2011/0107381 A1* | 5/2011 | Solnik et al. | 725/93 |
| 2011/0125759 A1 | 5/2011 | Querel et al. | |
| 2011/0145066 A1 | 6/2011 | Law et al. | |
| 2011/0225235 A1 | 9/2011 | Schmidt | |
| 2011/0225291 A1 | 9/2011 | Dobroth et al. | |
| 2011/0231383 A1 | 9/2011 | Smyth et al. | |
| 2011/0295852 A1 | 12/2011 | Wang | |
| 2012/0209839 A1 | 8/2012 | Andrews et al. | |
| 2012/0233191 A1 | 9/2012 | Ramanujam | |
| 2012/0295640 A1 | 11/2012 | Mei et al. | |
| 2012/0298640 A1 | 11/2012 | Mei | |
| 2013/0041837 A1* | 2/2013 | Dempski et al. | 705/345 |
| 2014/0258270 A1 | 9/2014 | Reese et al. | |
| 2014/0289228 A1 | 9/2014 | Mei et al. | |

OTHER PUBLICATIONS

Claims in European Application No. 12815280.8-1952, dated Jan. 2015, 4 pages.
Blount, S., "Talking Yellow Pages, Buyers in 20 Cities Now Let Their Fingers Do the Talking Through Automated Telephone Advertising Message Systems", vol. 10, No. 10, dated Oct. 1, 1987, 1 page.
International Searching Authority, "Search Report" in application No. PCT/US12/47478, dated Oct. 12, 2012, 19 pages.
International Searching Authority, "Search Report" in application No. PCT/US12/47476, dated Oct. 1, 2012, 11 pages.
International Searching Authority, "Search Report" in application No. PCT/US12/47475, dated Sep. 17, 2012, 24 pages.
International Searching Authority, "Search Report" in application No. PCT/US12/47473, dated Oct. 10, 2012, 17 pages.
European Patent Office "Search Report" in application No. 12815207.1-1952, dated Mar. 20, 2015, 13 pages.
European Claims in application No. 12815207.1-1952, dated Mar. 2015, 3 pages.
U.S. Appl. No. 13/553,684, filed Jul. 19, 2012, Notice of Allowance, Feb. 5, 2015.
U.S. Appl. No. 13/274,226, filed Oct. 14, 2011, Final Office Action, Feb. 24, 2015.
Claims in Australian Application No. 2012283930, dated May 2015, 5 pages.
Claims in Australian Application No. 2012283928, dated May 2015, 9 pages.
Australian Patent Office, "Patent Examination Report No. 1" in application No. 2012283930, dated May 5, 2015, 3 pages.
Australian Patent Office, "Patent Examination Report No. 1" in application No. 2012283928, dated May 12, 2015, 3 pages.
U.S. Appl. No. 13/553,646, filed Jul. 19, 2012, Notice of Allowance, Apr. 16, 2015.
European Patent Office, "Search Report" in application No. 12814832.7-1952 dated Mar. 25, 2015, 3 pages.
European Claims in application No. 12814832.7-1952 dated Mar. 2015, 5 pages.
U.S. Appl. No. 13/553,599, filed Jul. 19, 2012, Office Action, Sep. 17, 2015.
Canadian Intellectual Property Office, "Office Action", in application No. 2,842,213, dated Sep. 1, 2015, 3 pages.
Canadian Claims in application No. 2,842,213, dated Sep. 2015, 7 pages.
Claims in Canadian Application No. 2,842,255, dated Jul. 2015, 5 pages.
Claims in Austrailian application No. 2012283929, dated Jun. 2015, 8 pages.
Canadian Intellectual Property Office, "Examier Report" in application No. 2,842,255, dated Jul. 2, 2015, 5 pages.
Canadian Intellectual Property Office, "Exam Report" in application No. 2,842,215, dated Jul. 8, 2015, 3 pages.
Canadian Claims in application No. 2,842,215, dated Jul. 2015, 8 pages.
Australian Patent Office, "Patent Examination Report No. 1" in application No. 2012283929, dated Jun. 11, 2015, 3 pages.

* cited by examiner

Location Data Pipeline 200

Personalized Recommendations System 160

COMPUTER SYSTEM AND METHOD FOR ANALYZING DATA SETS AND PROVIDING PERSONALIZED RECOMMENDATIONS

CROSS-REFERENCE TO RELATED APPLICATIONS

This application claims priority from U.S. Provisional Patent Application No. 61/393,793 filed Oct. 15, 2010 entitled "Providing Personalized Recommendations".

The present disclosure may be related to the following commonly assigned U.S. Provisional Patent Application No. 61/393,800 filed Oct. 15, 2010 entitled "Generating Personalized Recommendations".

The respective disclosures of these applications/patents are incorporated herein by reference, as if set forth in full in this document, for all purposes.

FIELD OF THE INVENTION

The present invention relates to recommendation systems in general and in particular to a recommendation system that provides personalized recommendations to users, via user devices, in order to present informative and intuitive recommendations.

BACKGROUND OF THE INVENTION

The Internet has become a useful source of information relating to goods and services, but because so many users and companies are connected to the Internet and providing information of their own, it is difficult to find relevant information among all available information. One area of information is in recommendations. As individuals and groups are now able to connect to the Internet and retrieve information from websites and via apps, and do so perhaps while in transit towards a geographic area of interest, they come to expect the ability to find information about goods and services being offered.

One source of information is in the form of websites hosted by or for providers. As used herein, "website" refers to a collection of one or more web pages displayable by a browser or other web client, the one or more web pages being hosted on a web server (i.e., a computer coupled to the Internet, or other network over which communication occurs) that responds to requests for pages hosted thereon. An example might be a restaurant that generates information about its hours, pictures of its dining room, contact information, history, menus and other offerings, then puts that information into a suitable form (such as HTML pages, dynamically generated pages, etc.), stores those pages in electronic storage accessible by the web server (hosted by the restaurant or perhaps a company that specializes in web presence that provides such services to the restaurant), and then serves those pages as client devices request pages. The information might also be presented in another form, such as data supplied to an app on the client device rather than a generic browser on the client device.

However, the restaurant gets the information to interested users, it is still limited to information sourced by that restaurant. A number of websites have been set up to collect information from other customers of a vendor of goods or services and provide reviews and comments and other details to other customers or potential customers. For example, there might be a website that focuses on hotels, another on restaurants, another on home repair, or a general one. However, these websites might just have too much information to be useful to a user searching for relevant recommendations.

An improved recommendations system is desirable.

BRIEF SUMMARY OF THE INVENTION

Embodiments of a computer-implemented method and system for providing personalized recommendations for a target user based at least on stored data about the target user are described. The system comprises a processor and a computer readable medium containing code executable by the processor to perform the computer-implemented method for providing personalized recommendations for the target user.

One method comprises obtaining a plurality of feedback data from a plurality of users, wherein the feedback data comprises an indication of a media object, a response obtained from target user related to the feedback data, and at least one demographic data element associated with the target user. The feedback data is stored in a feedback database, wherein the feedback database is searchable by media objects. A set of personalized recommendations for the target user are identified based at least on stored data about the target user and the feedback data related to the user.

The personalized recommendations system identifies media objects to potentially provide to the target user in connection with the set of personalized recommendations, and selects or filters the identified media objects to form a set of personalized media objects. The set of personalized media objects are provided to the target user wherein the selecting or filtering is determined by considering which media objects are associated with desired response of users having demographic data elements aligned with demographic data about the target user. The method further comprises providing the set of personalized recommendations to the target user, including the set of media objects associated with the set of personalized recommendations.

The following detailed description together with the accompanying drawings will provide a better understanding of the nature and advantages of the present invention.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

An improved recommendation system is described herein. In order to provide a context for describing embodiments of the present invention, embodiments of the invention will be described herein with reference to a user device that receives user recommendations. Those skilled in the art will recognize, however, that the present invention is not limited to such embodiments.

It should be understood that, given the complexity of the operations performed, the invention is implemented using computing elements and may also include communication elements that convey data between disparate locations.

Personalized Recommendations

Figure 1:
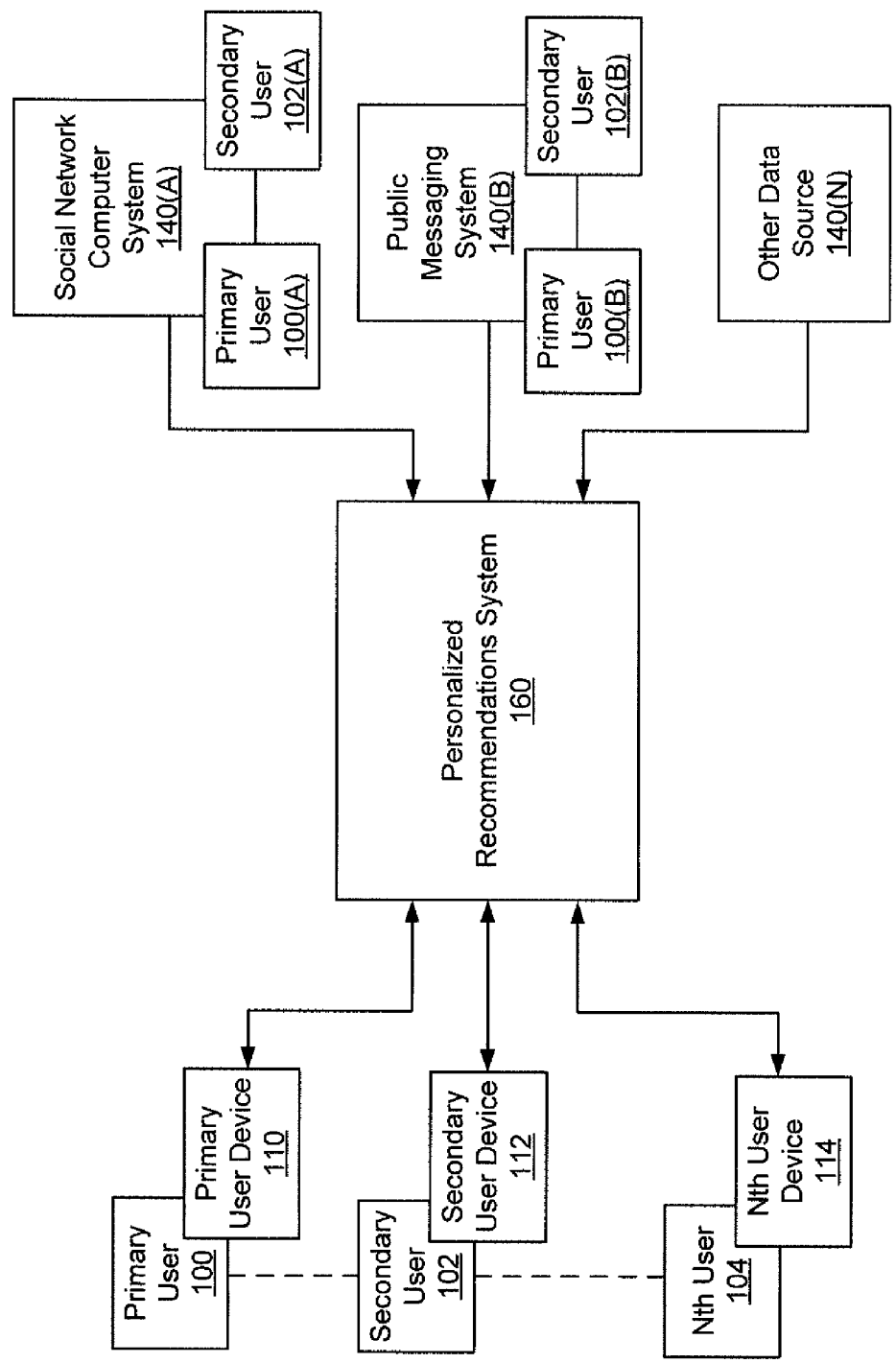
FIG. 1 is a block diagram of a personalized recommendation system according to aspects of the present invention.

In FIG. 1, an exemplary personalized recommendations system according to an embodiment of the invention is shown. The personalized recommendations system 160 may be coupled to a plurality of users, such as a primary user 100, secondary user 102, or any number of users 104. There may be relationships between specific users, for example, the primary user 100 and secondary user 102 may be friends, family members, or co-workers. The plurality of users may be coupled to the personalized recommendations system 160 through associated user devices 110, 112, and 114. User devices may include mobile phones (e.g., a Blackberry® phone, an iPhone® device, an Android™ device), tablets (e.g., an iPad® tablet), or other electronic devices.

The personalized recommendations system 160 may obtain inputs from any number of users 100, 102, 104, registered with the personalized recommendations system 160. The users 100, 102, and 104 may be interconnected and have relationships with one another. The inputs may be transmitted through the user devices 110, 112, 114 via an application. The user devices 110, 112, 114 may be connected to the personalized recommendations system 160 through the internet, a wireless network, a telecommunications network, or any suitable communications network. For example, the primary user 100 may use the primary user device 110 to download and install an application issued by the personalized recommendations system 160. Through the application, the primary user 100 may edit personal ratings for entities, such as venues and restaurants, and other personal preferences, such as cuisine, type of food, price range, location, distance from current location, etc. The primary user 100 may also provide feedback items or data through the application to respond to recommendations, to add or remove entities, and/or rate an experience at an entity. In other embodiments of the invention, entities may include merchants and service providers.

Additional inputs to the personalized recommendations system 160 may come from external data sources, for example, a social network computer system 140(A) such as the Facebook® computer system, a public messaging system 140(B) such as the Twitter® messaging system, and/or any number of other data sources 140(N) via the user accounts 100(A), 100(B), 102(A), 102(B) with the data sources and/or user devices 110, 112. The external data sources may also provide raw location data of the users, for example, through a "check-in" through system 140(A), system 140(B), or other social networking provider system capable of providing raw location data.

Figure 2:
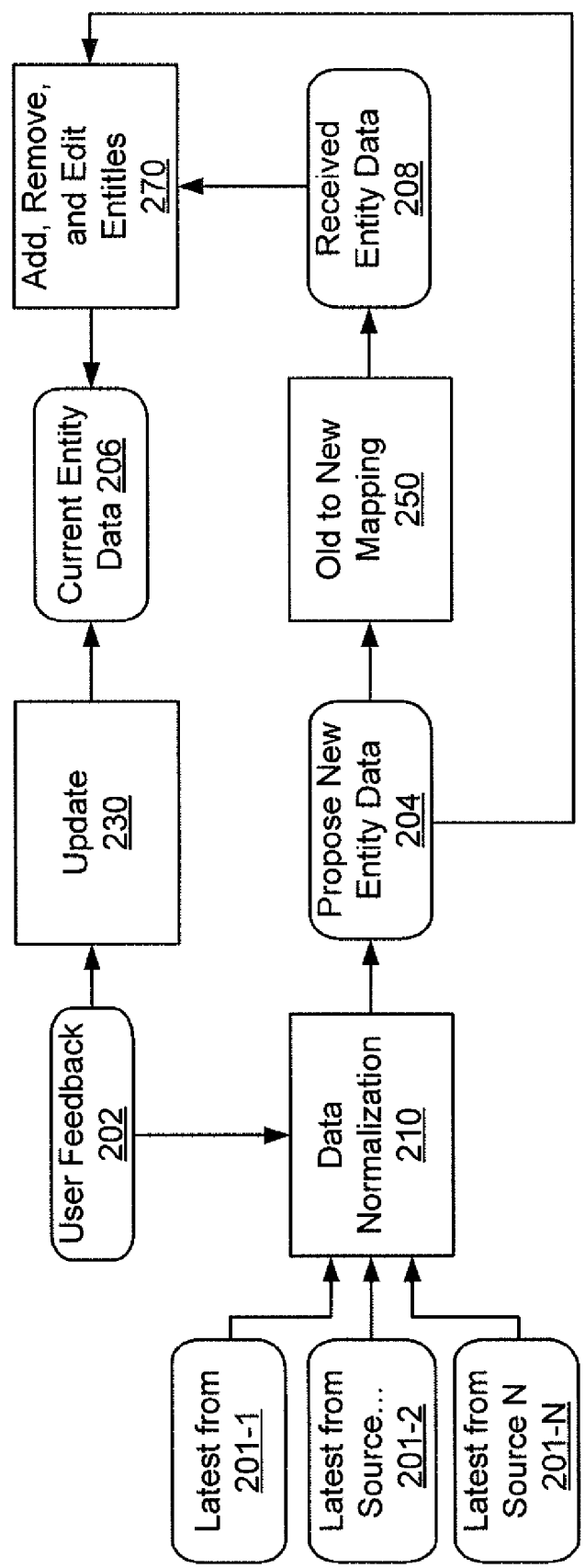
FIG. 2 is a block diagram of a location data pipeline that might be used to generate entity data.

FIG. 2 is a block diagram of a location data pipeline 200, which illustrates, according to embodiments of the invention, how location data is processed by the personalized recommendations system 160. In an embodiment of the invention, the location data pipeline 200 may be used to build a database of entities. The latest data from different sources 201-1, 201-2, 201-N, may be raw location data from the external data sources of FIG. 1. The raw location data may be obtained through a GPS interface or other locating system. A user may also provide direct feedback regarding the user's location or entities.

The personalized recommendations system might include a data canonicalizer 210 that maps vague, duplicate and/or inconsistent references to entities (such as restaurants, shops and other businesses) that are "canonical" in that different phrasings, spellings, wording, etc. that actually refers to the same place all map to an entity record for that one place. Data canonicalization may be performed on the location data from different sources 201-1, 201-2, 201-N (raw location data) and user feedback 202 (un-raw location data). In various embodiments, the personalized recommendations system normalizes and/or canonicalizes data (both raw and un-raw) across many different data sources about entities including physical places, events, and activities. Canonicalizing the entities includes a de-duplication process that fuses the information from the many data sources into a single dataset, producing a higher quality set of data than any of the individual data sources.

After the data is canonicalized, there may be new entities introduced, for example, the personalized recommendations system may propose new entity data 204. The location data associated with new entities or entities may be mapped to existing, or old, location data. The old to new mapping 250 may result in resolved entity data 208, which may have removed duplicated entities from the location data from the difference sources. Therefore, the resolved entity data 208 may have a set of unique entities.

The user feedback 202 may comprise direct updates 230 to the entity database by providing current entity data 206 from the user. Updates 230 may include adding or removing an entity, or editing information associated with the entity, for example hours of operation. The update 230 is entered in a database of current entity data 206, or an entity database. The resolved entity data 208 may also be used to add, remove, and edit entities 270 within the current entity data 206. Proposing new entity data 204 may also be used to add, remove, and edit entities 270 within the current entity data 206, to result in building the database of entities with updated information, unique instances, and associated user data.

The personalized recommendations system cross references all of the meta-data about an entity to perform the canonicalization, for example when determining if multiple locations across multiple data sources are the same, and should all map to the same canonical place, the personalized recommendations system may look at names, addresses, phone number, type of place, etc. The personalized recommendations system may also improve the meta-data about the canonical places, by incorporating different information from different sources, or functions of multiple sources. For instance, if one source always has the correct name, and another source always has the correct type, the system's canonical entity may use the name and type from different sources. The personalized recommendations system may use the canonical dataset when listing information about entities in a set of recommendations.

When performing canonicalization, the personalized recommendations system may preserve the mapping between each entity in the noisy datasets (the mapping may or may not be one-to-one), to the entity in the canonical dataset. The personalized recommendations system may use this mapping for cross referencing other relevant data from disparate sources and mapping it to a single canonical source. For example, referring to FIG. 1, if an entity from data source 140-A has a number of check-ins associated with a canonical entity, and an entity from data source 140-B also has a number of reviews that have been associated with the same canonical entity, the check-ins and reviews may all be associated with the associated canonical entity.

The canonicalization may work in many passes, where multiple data sources are merged simultaneously, or may be merged sequentially, or a hybrid of both solutions. Machine learning approaches may be used to learn how to merge these data sources, and may model which meta-data is more reputable from which source.

Because the canonicalization step may preserve a mapping from the entities in the noisy datasets to the canonical dataset, personalized recommendations system may crawl and pull feeds and other textual, video, visual, and auditory data from data sources about the noisy datasets, which in turn may be used to understand metrics of the relative importance of different entities in the canonical dataset. These data sources contain direct metrics of importance of individual entities including check-ins, reviews, and messages. These services also contain or may cross reference indirect information from other services such as the page rank of a website associated with a place. Also, rather than just directly using these metrics, other functions of these metrics may be used (both implicit and explicit), such as the speed at which check-ins or messages about an entity are coming in, other functions of subsets of check-ins or messages, check-ins or messages of sub-classes of individuals, etc, rather than just using aggregates. These metrics may be used as proxies for popularity, or could be fed into algorithms to learn popularity scores.

Figure 3:
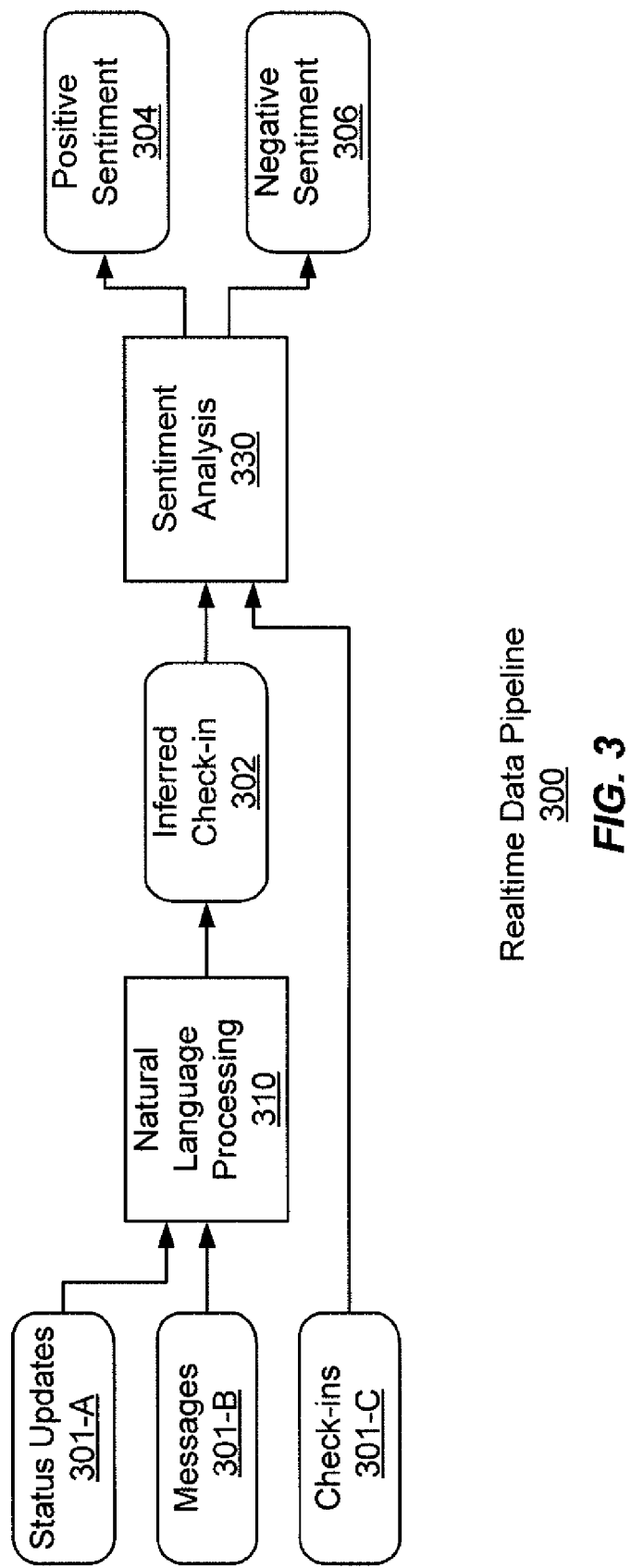
FIG. 3 is a block diagram of a sentiment generation pipeline that might be used to generate sentiment information about information elements.

FIG. 3 is a block diagram of a real-time data pipeline 300 according to embodiments of the invention, which illustrates how real-time data, such as textual data, is processed by the personalized recommendations system 160. Real-time data may include textual data, such as status updates 301-A from a social networking system, such as the Facebook® system, or messages 301-B from a public messaging system, such as Tweets® from the Twitter® messaging system. The textual data may be processed using natural language processing 310, to parse and interpret the text and its context. For example, a status update mentioning "Don Giovanni's" could refer to a user named Don Giovanni, or it could refer to an Italian restaurant chain that operates under the Don Giovanni trade name. The natural language processing 310 step will analyze the context of the status to determine whether an entity, such as a venue or restaurant is mentioned. If through natural language processing 310 it is determined that an entity has been mentioned, then an inferred check-in 302 is associated with the real-time data from the user.

Together with location data such as a direct check-in 301-C that provides raw location data, along with the inferred check-in 302 determined by real-time textual data, a sentiment analysis 330 is performed. The sentiment analysis 330 maps the venue from the raw location data (e.g., check-in) with the venue from the real-time data processed using natural language processing (e.g., inferred check-in) to determine whether the user had a positive or negative experience. A real-time textual data associated with a positive experience, for example, "I had the best burger at ABC Restaurant!" would result in a positive sentiment 304 associated with venue ABC Restaurant determined by the sentiment analysis 330. A real-time textual data associated with a negative experience, for example, "The service could be better at XYZ Restaurant . . . " would result in a negative sentiment 306 associated with venue XYZ Restaurant determined by the sentiment analysis 330.

The sentiment analysis can be general or specific to particular dimensions. For example the textual data "The service was terrible, but the food was great at XYZ Restaurant . . . " can be analyzed by Sentiment Analysis to understand that in the Food Quality dimension there was positive sentiment, but in the Service dimension there was negative sentiment. In other embodiments, real-time data may include video, audio, or other media data to be processed for content.

In various embodiments, the personalized recommendation system employs methods to make recommendations more personalized. Conventional approaches such as collaborative filtering techniques generally use explicit ratings given by users. The personalized recommendations systems also may model implicit information such as check-ins, functions of check-in rate, or discussion and sentiment about specific entities on services such as Facebook®. For physical locations or events, the personalized recommendations system may use GPS in addition with other signals, such as indication to attend an event, to determine a location someone has visited without their explicit statement to do so. If the user is not explicit, noisy information about the GPS and the GPS's accuracy may still be used to improve results. For example, in the simplest case, if the GPS does not have sufficient resolution to know which of 4 stores a user is at, but the user has checked in at one of the 4 stores before, it is much more likely the user is at the entity the user has checked in. As a more sophisticated example, if the personalized recommendations system has 10 different GPS readings from different periods of time, the personalized recommendations system may look at the intersection of those readings, factoring in GPS noise, to determine where the user has actually been going.

Other information that may be used to improve personalized recommendations is data related to affinity groups. These groups may include, for example, friends on social networks, explicit groups such as Facebook® groups, or implicit affinity by looking at the frequency of discussion between individuals, such as Facebook® wall posts or cellphone text messages. The implicit membership groups may also be as general as being part of an implicit population due to observations by the system, for instance, by noticing that the user is in the group of users that like the opinions of experts. These types of recommendations may also have different classes of weights. For instance, if a specific user is more likely to listen to his or her family than friends, a user family member's recommendation would have a higher weight to the user. One example of how the personalized recommendations system could determine this would be observing the types of recommendations that a user acts upon, for instance by seeing if a user made a reservation at a restaurant, and observing that there is a trend that when family members gave positive recommendations, then the user was more likely to select the entity than if another type of user gave the recommendation. One example about who should be treated as family would be looking at associations through services such as Facebook®, or other social networking sites, which may have this personal and/or stored data explicitly.

An example of an approach implicitly determining affinity is by having the system collect background GPS information of two users, for instance by getting information from a user's phone at specified time intervals or triggered by other more sophisticated models. By cross-referencing two users who are at the same location, that the system understands are related according to a social graph (in the general sense of modeling affinity between individuals not necessarily in the "Facebook®" sense), the personalized recommendations system may understand which groups of users spend time with one another. By social graph, the personalized recommendations system means a model of a mapping between users who interact with one another. This modeling may also model simple relationships such as whether a pair of users are coworkers, or more sophisticated information such as how often two users interact, or how likely they are to take other people's recommendations.

The personalization of recommendations also may be improved by automatically clustering based on similarity traits. This is another method of modeling affinity groups. Associating similar users into clusters may use explicit information, such as demographics or shared music tastes from a Facebook®" profile, or implicit information, such as the different distributions of common word frequencies in Twitter® messages between users. For example, if two Twitter® users both use the words "hella" or "wicked," these may be signifiers about geography, which in turn are signifiers about similarity between users.

By monitoring the decisions of individuals based on their interactions with personalized recommendations and personalized media objects associated with the personalized recommendations, the personalized recommendations system may also improve its personalization. It may infer preference based on which individual items, or classes of items that have had action taken upon them. These preferences may have different weights based on different actions taken. For example, given a restaurant recommendation, clicking through to get more information about a restaurant tells the system that the recommendation was interesting. The duration on which the user spends viewing the restaurant information and the other interactions tells still more information about how compelling the recommendation is, and taking further action such as calling an establishment, or making a reservation indicates an even higher level of relevance for a recommendation. In various embodiments, the foregoing actions and/or interactions may be observed at least in part by a client application running on a smart phone or other device used to provide the recommendations. The monitoring of interactions may include higher level interactions than just specific recommendations, it may look at groups of recommendations, which may or may not be categorized explicitly.

The personalized recommendations system may fuse many of these techniques into a single approach of popular, socially relevant, and personalized recommendations.

The personalized recommendations system applies a system for using Natural Language Processing (NLP), specifically named entity recognition (NER) and sentiment analysis, on user generated messages, such as those on Facebook®, and Twitter®, to understand the content of messages. The personalized recommendations system first performs name-entity recognition to understand the mapping between a message, for instance a short-form message on Facebook®, and the entity in the personalized recommendations system, such as a location or event, which the message is about. The personalized recommendations system may then perform sentiment analysis on the messages to understand whether the experience at a given entity was a positive or negative experience, and to what degree. The sentiment analysis may go further to understand why the user had a good time, for instance great food, good ambiance, etc. for a restaurant.

The personalized recommendations system applies this NLP approach in different areas of the personalized recommendations. Firstly, the personalized recommendations system uses this information as additional information to be fed into our recommendation engine to make personalized recommendations, especially given the knowledge of the relevancy of the message to the individual, using the affinity group approach previously described. Secondly, personalized recommendations system may surface the messages, and automatically group them into areas of a product that describe information about why a user should do something, or shouldn't do something. The system may use explicit information a user has provided, to correct the system's mistakes of an incorrect categorization and improve learning approaches, such as the named-entity recognition or sentiment analysis. For instance, the user may tag a message as being positive sentiment, rather than negative. The system may also perform implicit modeling of relevant messages, for instance, by showing different sets of messages to different users, and seeing how the presence (or lack) of specific messages affect decision making of users, or groups of users. The system may learn the importance of different types of information to each individual's decision making, and may use the importance of those metrics when making the recommendation calculations, or determining which results to show to a user.

Figure 4:
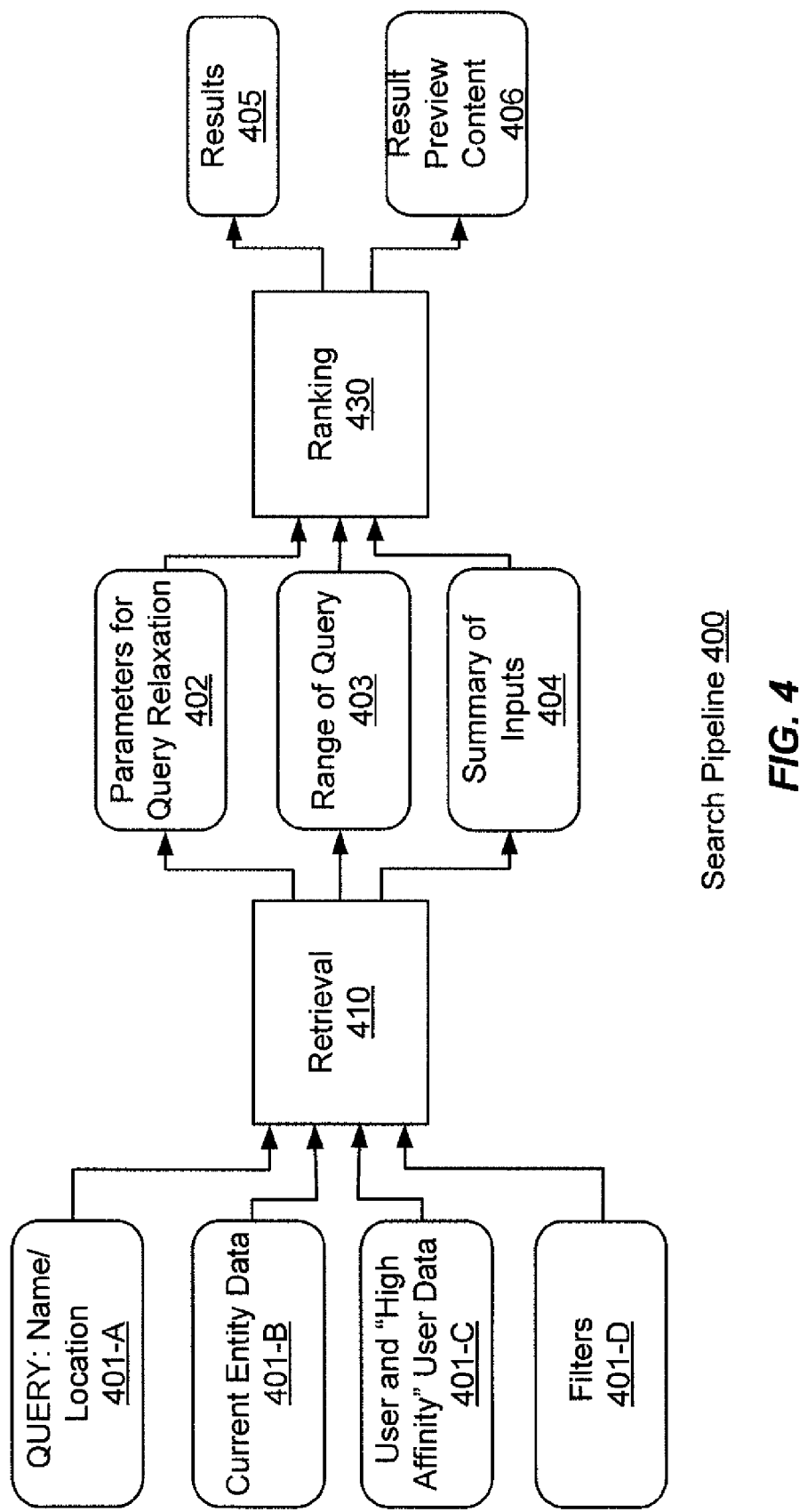
FIG. 4 is a block diagram of a search pipeline that might be used to generate results for use in user recommendations.

FIG. 4 is a block diagram of a search pipeline 400 according to embodiments of the invention. In another embodiment of the invention, the user may have a query to make the personalized recommendations even more specific and targeted. In addition to the previous data (e.g., raw location data, un-raw location data, real-time data) obtained by the personalized recommendations system 160, the user may also enter a query 401-A. Examples of queries may include a name of a restaurant, desired location, price range, or cuisine. The query 401-A may be entered into a retrieval module 410 in the search pipeline 400 of the personalized recommendations system 160.

Other inputs into the retrieval module 410 may include current entity data 401-B, user and/or "high affinity" user data 401-C, and filters 401-D. User data, including "high affinity" user data, may include demographic information, such as age, residence, gender, ethnicity, and other information. "High affinity" user data may include cluster demographic data, for example, observed trends of preferred venues amongst a cluster demographic, such as age or gender. For example, past user data may show that males age 21-29 enjoy going to venues that serve beer, whereas women in the same age group prefer venues that serve cocktails. The target user entering the query may have demographic data that may be matched with a cluster demographic to determine the target user's affinity to entities with other users within the same cluster demographic. In other embodiments the target user may have relationships with other users, which may affect the target user's preferences. For example, the target user's significant other may have an influence on the entities patronized by the target user because they are romantically involved and spend a lot of time doing activities together, making the significant other a "high affinity" user to the target user, thus retrieving the "high affinity" user data may also occur and be processed.

Other examples of "high affinity" users may be users who have many connections on social networking sites, and/or are considered highly influential amongst a group of friends. A more popular user may have a higher influence on other users. Thus, the popular user's activities and status updates, including the entities the popular user patronizes, may be exposed to more friends and connections through the popular user. Additionally, a "high affinity" user may be an expert in a particular field or a celebrity, and therefore may have followers on various social networking sites (e.g., Twitter®). For example, a food critic for The New York Times® or a movie star may have numerous followers and fans who would be influenced by the food critic or movie star's activities and status updates.

The retrieval module 410 may produce several outputs, such as parameters for query relaxation 402, a range of query 403, and a summary of inputs 404. Parameters for query relaxation 402 may include parameters to expand the original query 401-A of the user. For example, if the user entered a specific restaurant name, but was not sure how to spell it or spelled it incorrectly, the retrieval module 410 may relax the query to include other spellings to determine the restaurant that the user is intending to search for. A range of query 403 may be determined by the retrieval module from the input data 401, for example, a query to search for Chinese food. The retrieval module 410 may also result in a summary of the inputs 404, the inputs including the query 401-A, current entity data 401-B, user data 401-C, and filters 401-D.

After consideration of the parameters for query relaxation 402, range of query 403, and the summary of inputs 404, a set of recommendations are produced for the search. A ranking 430 may be performed on the set of recommendations to produce final results 405 in response for the search query by the user. The results 405 may also include result preview content 406, such as personalized and customized summaries of the venues recommended, or noting "high affinity" users' opinions of the venues recommended. For example, the result preview for an entity may be a personalized summary customized to inform the user that the entity is rated highly by the user's significant other. Based on previous data retrieved, processed, and stored relating to the user, the personalized recommendations system 160 may determine that the user particularly likes burgers, so in the personalized summary of a restaurant, may specifically mention reviews about the restaurant's burgers. The result preview content 406 of a suggested recommendation may be designed to entice the user in a personalized and customized manner to increase the probability of a desired response, which is an indication of interest in the suggested recommendation.

The indication of interest may include a request for more information regarding the suggested recommendation for an entity (e.g., clicking on a link to a website for the entity, browsing the summary or reviews of the entity, making a phone call to the entity), a purchase transaction with the entity (e.g., making a purchase or payment), or any other future transaction with the entity (e.g., visiting the entity). In other embodiments, the indication of interest or relevance may also be determined by detecting whether the user has viewed additional information regarding the suggested recommendation for an entity, how many times the user has viewed the information, and how long the user has viewed the information. The additional information may be meta-data about the entity (e.g., hours of operation, location), a personalized summary about the entity, or a personalized explanation about why the entity has been recommended to the user.

The personalized recommendations system may model the relationships between users as a graph. In this graph, users are nodes. Edges represent relationships between people. Directional edges may model uni-directional relationships, such as if user A follows user B on Twitter®. The personalized recommendations system may represent a symmetric relationship like friends have on Facebook®, as two, directional edges, or a unidirectional edge. These relationships may be about different associations than social affiliations, such as an expertise graph where an edge from user A to user B means that user A believes user B may be an expert. There may also be weights on these edges, which for example, might represent the confidence in someone's expertise, or how friendly two users are. For this representation, personalized recommendations system may compute different statistics about the users graph. These could be measures of people's expertise or of people's popularity, which in turn may be used as a proxy for ability to influence others.

These measures may be computed 1) globally by examining the entire graph, 2) about a subset of the graph, for instance based on a) the friends-of-friends for a specific individual, or b) a subset of the graph based on other similarity measures. This graph may be represented as a Markov model. This graph may be analyzed by performing a random walk from one node representing a user, to another node, with the probability of transitioning to a new state to be proportional with outgoing edge weight. By computing the stationary distribution over the states on this graph, personalized recommendations system may compute the proportional relevance of each user given the model, where depending on the model, this relevance may be interpreted as a user's expertise or popularity. These relationships may be used to modify the order of results, or to determine who to associate with a specific recommendation to convince a user to take action on that recommendation. For example, the system could use this model to know that a friend of yours is well regarded as a coffee expert, so if the personalized recommendations system are recommending coffee, using the coffee expert's comments or ratings about a specific coffee shop could be influential in helping a user make his or her decision. In turn, if this will be more convincing, in a list of results provided, the personalized recommendations system may rank this recommendation, with the coffee expert's comments, higher in the list, as it will be more compelling to the user.

Figure 5:
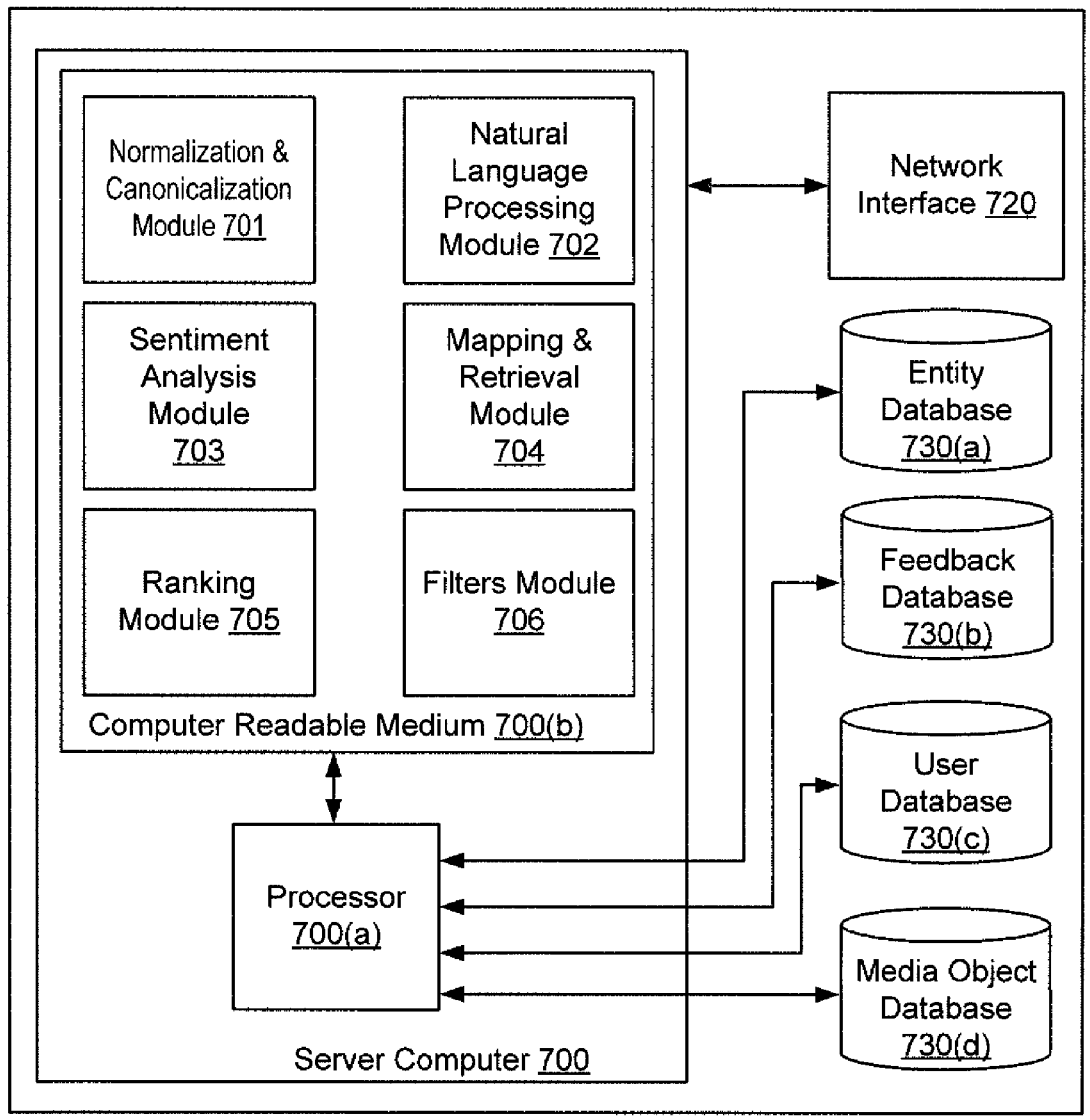
FIG. 5 is a block diagram of a modularized personal recommendations system.

FIG. 5 is an exemplary personalized recommendations system 160 according to embodiments of the invention. The personalized recommendations system 160 may be operated on a server computer 700, comprising a processor 700($a$) and a computer readable medium 700($b$). There may be several databases to store data, for example, an entity database 730($a$), a feedback database 730($b$), a personal data database 730($c$), and a media object database 730($d$). Stored in the entity database 730($a$) may be normalized and canonicalized data relating to entities, including entity meta-data (e.g., location, hours of operation, specialty, rating). Entity meta-data may include any sub-category of data related to the entity. The feedback database 730($b$) may store feedback data from a plurality of users. Any user interaction with the personalized recommendations system, or application issued by the personalized recommendations system, may be included in the feedback data stored in the feedback database 730($b$). The personal data database 730($c$) may store personal data obtained from a plurality of users, such as real-time data from social networking sites (e.g., Tweets®, status updates), and stored data related to a plurality of users, such as user preferences and settings (e.g., gender, dietary restrictions). The real-time data may be explicit or implicit, and may include text, images, video, audio, or other media. The stored data may be directly obtained from the user or may be obtained from external data sources, such as a social networking site associated with the user. The personalized recommendations system 160 may also include a media object database 730($d$), storing media objects, such as high resolution photos. The media objects may be associated with entities, recommendations, and/or the target user.

The computer readable medium 700($b$) of the personalized recommendations system 160 may comprise software modules, containing code executable by the processor 700($a$). Exemplary modules included in the computer readable medium 700($b$) may include, but are not limited to, a normalization and canonicalization module 701, a natural language processing module 702, a sentiment analysis module 703, a mapping and retrieval module 704, a ranking module 705, and a filters module 706. The processes of these exemplary modules have been described previously for FIGS. 2-4.

The personalized recommendations system 160, to communicate with external data sources, social networking sites, and users, may include a network interface 720. The network interface 720 includes hardware and software that enables the personalized recommendations system 160 to transmit and receive data over the Internet or any other communications network (e.g., telecommunications network, cable, radio).

Presentations on User Devices

Figure 7:
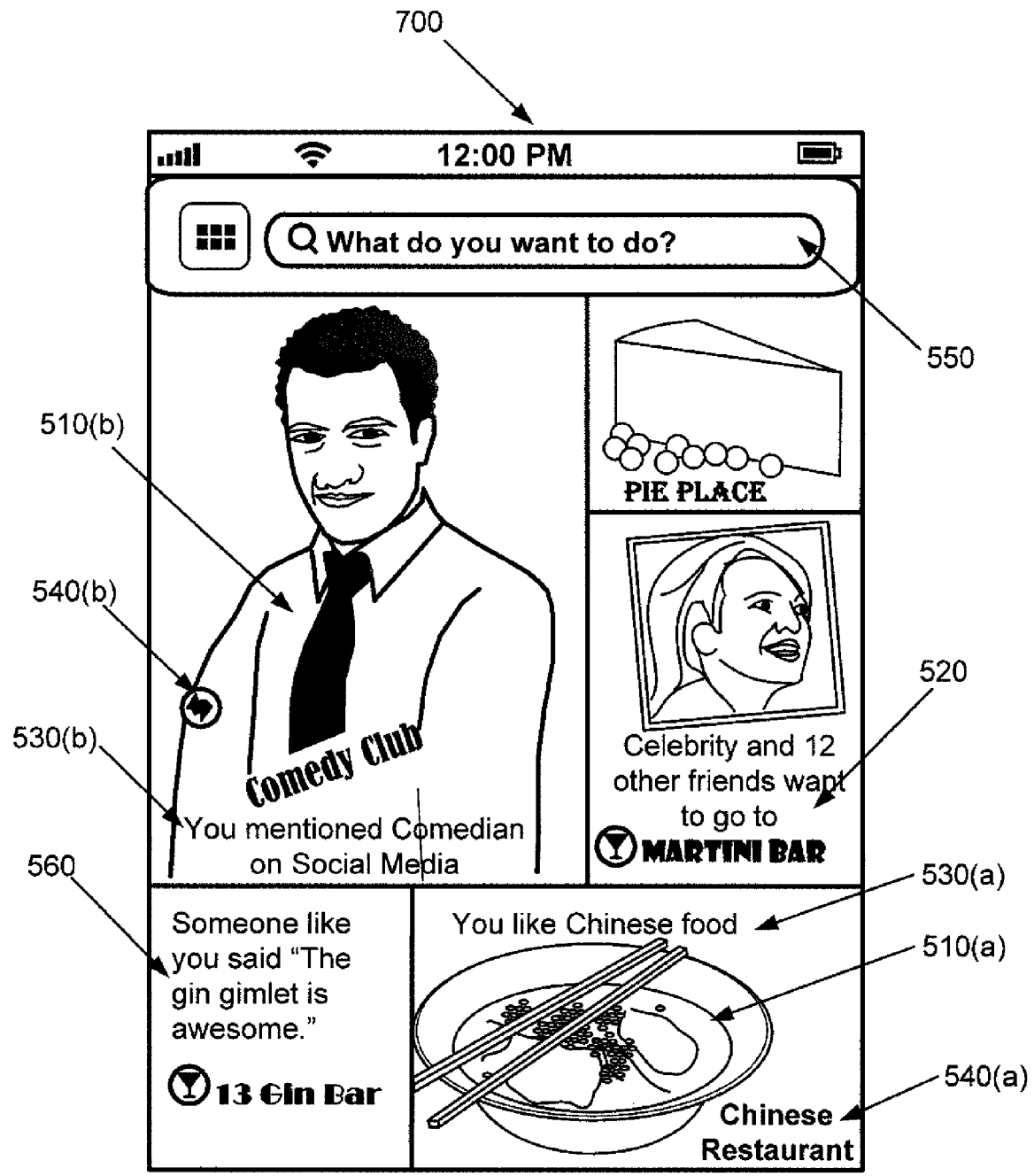
FIG. 7 is an illustration of a user display of selections of goods and services, determined based on personalized recommendation system results.
Figure 8:
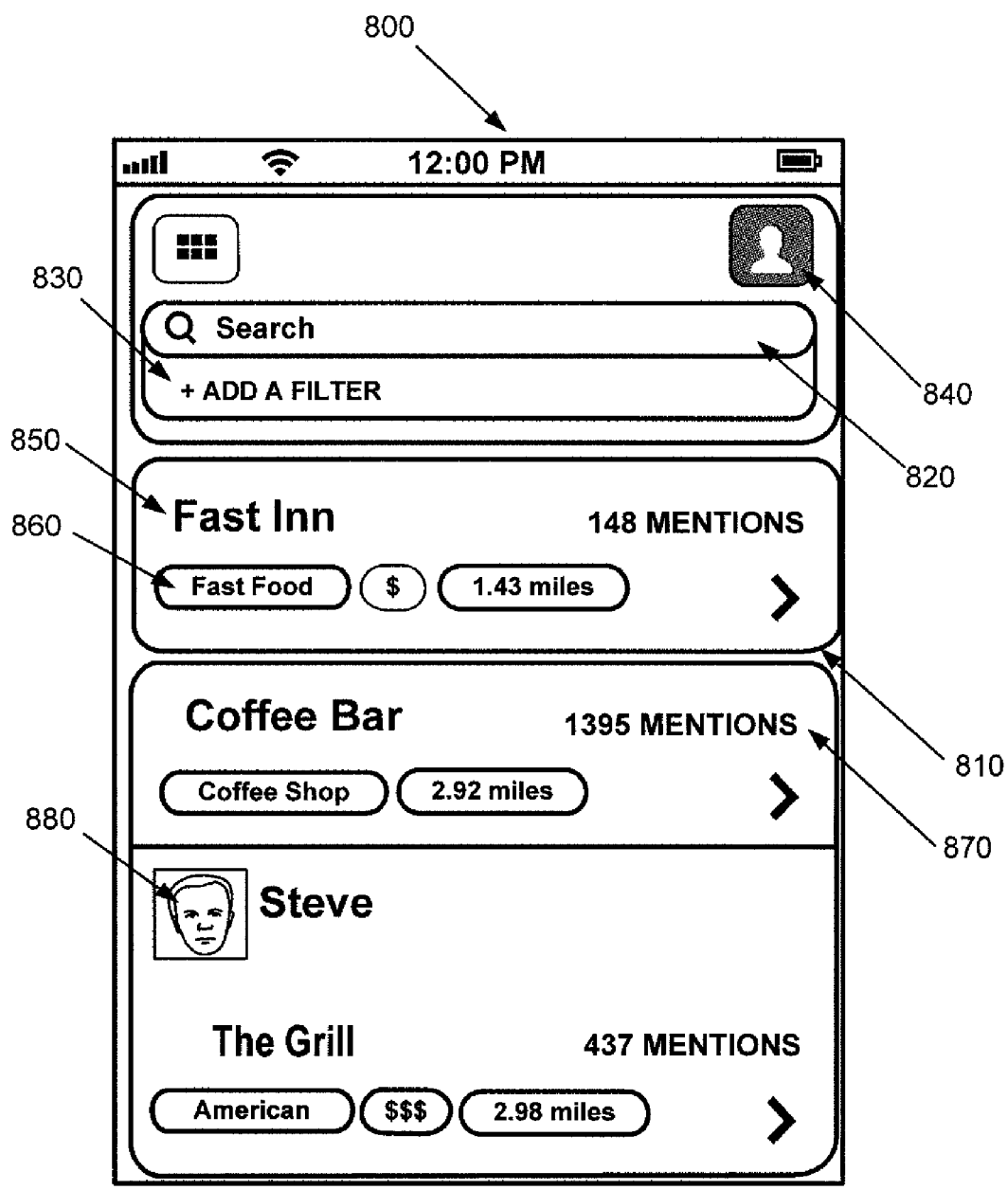
FIG. 8 is an illustration of a user display of selections of goods and services, determined based on personalized recommendation system results, in an alternative presentation.

In various embodiments, the perceived relevance and attractiveness of recommendations are enhanced by showing high-quality photos that are either 1) from/about the specific content being recommended, or 2) related to the type of recommendation being made, for instance showing images of ice cream if a Ben and Jerry's® ice cream shop is recommended. Examples of interfaces that the personalized recommendations system might use are high-quality photos, as shown in FIGS. 6-8.

Figure 6:
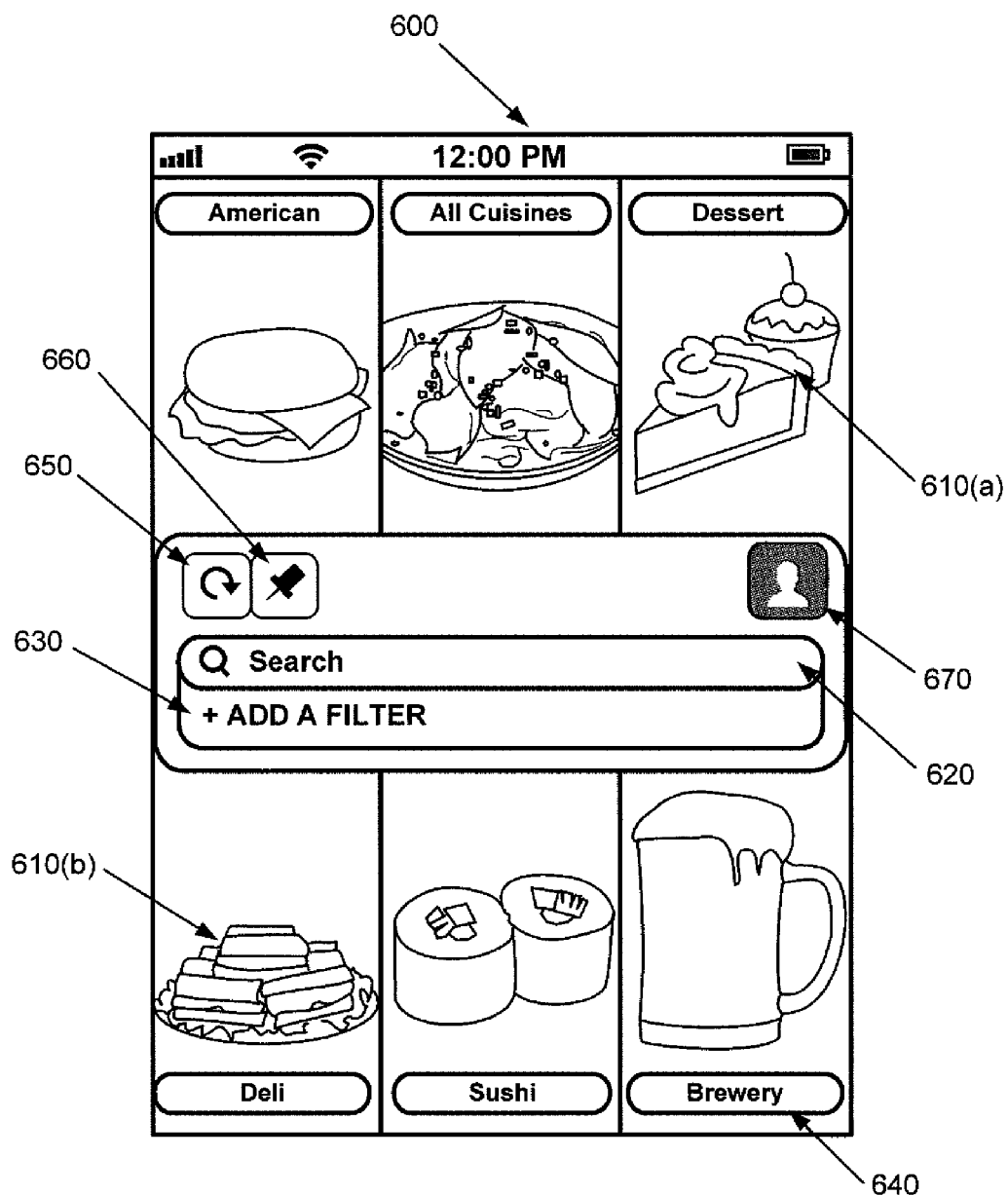
FIG. 6 is an illustration of a user display of categories of selections, with the categories determined based on personalized recommendation system results.

FIG. 6 is an exemplary screenshot of a user interface 600 provided by the personalized recommendations system according to embodiments of the invention. The user interface 600 for a search may include media objects (e.g., high resolution images) 610(*a*) and 610(*b*), related to general categories, such as cuisine type 640. The user may enter a query into a search field 620, and specify filters 630 to narrow down the search. The user interface 600 may include other icons, such as a profile icon 670 to edit personal and profile settings. Additional icons may include a refresh icon 650 to refresh the search, screen, or recommendations, and a pin icon 660 to mark a recommendation.

These photos may also be used with other recommendation information to custom-tailor the experience to the tastes and preferences of the individual. For example, if personalized recommendations system are recommending a bar and know the user who is receiving the recommendation is a heterosexual male, it may be more incentivizing to show a photo of an attractive woman at a bar, rather than an attractive man. As the personalized recommendations system learn more about what incentivizes people, this approach could be extended to modify the imagery based on the experience. For instance, the system could determine whether an attractive user of the opposite sex, or a tasty mixed drink is more likely to drive a user to take action on and provide feedback data in response to a recommendation.

When making this determination, the system may use very different factors. For example, if using global popularity, types of photos are analyzed to determine the most compelling in general, for a category, or for an individual entity. Other examples of features include more population relevant information about the user such as demographic information, to more personalized information such as which types of photos have induced them to choose recommendations before by observing their click stream. Methods that fuse global, population-relevant, or individual history may all be fused together when making this distinction. The use of these photos may be used for many different purposes including examples such as 1) driving users to take action on organic recommendations, organic recommendations being recommendations determined by the personalized recommendations system as the most relevant, rather than paid-recommendations like ads, 2) driving users to click on advertisements, 3) driving users to click on something for lead-generation, 4) driving a transaction such as a purchase or a recommendation, and/or 5) driving users to go to a location. The personalized recommendations system may also couple text with the photo or other media object, messaging important rationale, facts, opinions, or tag-clouds, which a user might use to take action on a recommendation. The use of images may pervade the experience in implicit ways, in addition to explicit ways of selling a user on making a decision. As illustrated in FIG. 8, showing an alluring photo as a background image, may also be used as subtle hints to induce users to make decisions.

In contrast to conventional search-based results, the system also supports discovery experiences, where the number of recommendations may range from a single recommendation to a large number of recommendations, as shown in FIG. 7. Discovery recommendations address situations where rather than the user knowing what the user is looking for, the user would like to explore many options. Discovery recommendations may take many forms. For physical places, recommendations do not need to necessarily be just about the entity itself, but could be about meta-data about the place, for instance the type of users who are at an establishment, or the ambiance. The discovery may be motivated by other related habits or activities, such as recommendations of concerts based on known music tastes. This discovery may also be scoped by social context, for instance by telling the system you wish to participate in an activity with a specific person, but the system should determine what. This could be scoped even further, to articulate a person, and a scoped activity, for instance user X, eating a meal. In response the system may recommend, for example, a restaurant the user and (if known) the user X would like, at a location convenient to both. This discovery may be more fine-grained than just an activity, but a specific experience at a locale, for instance getting a specific drink at a specific bar. The mechanisms for discovery may also be more geared more toward an exploration format, rather than an explicit list of suggestions. For instance, the user could request more recommendations similar to a specific recommendation, when the recommendation is close, but not quite right. This information may also be fed into a model for understanding what types of topics interest a user.

Recommendations may be rendered in many formats beyond conventional list-based format, including but not limited to representations of more image-driven formats such as those illustrated in FIGS. 6-7. Examples of the format of these image-driven recommendations include 1) pictures or messaging about the entity recommended, for instance a place, 2) pictures or messages associated with the type of entity, for instance a Chinese food for Panda Express®, 3) pictures or messaging about users who like such a place, including but not limited to a) experts, b) celebrities, c) real friends, d) virtual friends, e) similar people, f) relevant users (for instance those will be deemed more attractive to a user) and f) the general population. For pictures or messaging about users who like an entity, this may include messaging examples such as 1) a popular entity, 2) a trending entity, 3) entity's liked by users who are similar to specific people, including the user receiving recommendations. Examples of pictures about users who like such recommendations may include 1) abstract images representing users' interests, 2) photos of such people, 3) photos of avatars, 4) images representing a group or affiliation of the user, or 5) other representative images related to individuals.

FIG. 7 is an exemplary screenshot of a user interface 500 provided by the personalized recommendations system according to embodiments of the invention. The user interface 500 may provide discovery recommendations associated with entities. The discovery recommendations may be for products, service, or activities provided by the entity, or for the entity itself. For example, media object 510(*a*), displaying Chinese food, relates to a recommendation for a specific Chinese restaurant 540(*a*). This recommendation for the restaurant 540(*a*), and the corresponding media object 510(*a*), may be accompanied by a personalized explanation 530 of the recommendation. In this example, the image displaying Chinese food 510(*a*) corresponding to the recommendation for the specific Chinese restaurant 540(*a*), is based on a determination by the personalized recommendations system that the user likes Chinese food 530.

In other embodiments of the invention, a recommendation for an activity at an entity may be provided to the user. For example, media object 510(*b*), displaying a comedian, relates to a recommendation for a specific comedy club 540(*b*). The personalized explanation 530(*b*) provided to the user indicates that the personalized recommendation 540(*b*) was based on previous personal data, such as a status update from Facebook®.

Other exemplary personalized recommendations may be based on global demographic data 560, for example. The personalized recommendations system, using the user's stored data from the personal profile or feedback data, may identify other users with similar demographic data and provide personalized recommendations based on the demographic data elements that align. Demographic data may include gender, race, location, age, or any other data related to a plurality of users. In other embodiments, the personalized recommendations may also be based on demographic, personal, or feedback data associated with a group of users having a relationship with the target user. For example, the group of users may be Facebook® friends whom the target user interacts with the most, Twitter® followers, or other relationships.

When making recommendations, there are many variations that the system will support. The recommendation does not need to be about an individual user, but rather, may be a recommendation for someone else, allowing a user to view the world through another person's preferences. Examples of this might include friends, experts, or celebrities. As a concrete example, a user might want to get recommendations for a bar in LA, as if they were a famous person or celebrity, such as a singer or rapper, or recommendations for a coffee shop as if they were actually a friend of theirs, who is a coffee connoisseur. In addition, the recommendations do not have to be for a single individual, but could be for a group. For example, if two couples wanted to work out where to go eat, the system could take all four users as inputs, and determine a group recommendation ideal for all four people.

In other embodiments of the invention, personalized recommendations to the target user may be made based on another user (e.g., secondary user). The secondary user may be another user with a relationship to the target user, or a celebrity, as shown in the personal recommendation 520. Additionally, the user interface 500 may comprise a query field 550 for the target user to enter in parameters, queries, or additional data to refine the personalized recommendations.

FIG. 8 is an exemplary screenshot of a user interface 800 provided by the personalized recommendations system according to embodiments of the invention. In the user interface 800, a set of personalized recommendations may be provided as a result of a search or query by the user. The user may enter a query into a search field 820, and optionally add a specific filter 830 to refine the search. A media object 810 may provide a background to the set of personalized recommendations and may be personalized to be associated with the set of personalized recommendations or with the target user. A personalized recommendation may include an entity 850, such as a restaurant, "Alpine Inn." Entity meta-data 860, such as cuisine, price range, and distance, may also be displayed. Other entity meta-data 860 may be displayed as a personalized summary based on the target user. The personalized summary may also include statistics or other content 870, based on canonicalized entity data and canonicalized location data. For example, 870 displays "148 MENTIONS," as an indicator of the entity's popularity to entice the target user to respond to the personalized recommendation. In other embodiments, data associated with other users having relationships with the target user may be displayed, as shown in 880, to entice the target user to respond and provide a feedback response to the provided personalized recommendation. For example, 880 shows a feedback message from another secondary user having a relationship with the target user, related to the personalized recommendation provided for "The Grill."

In various embodiments, statistics may be provided about a recommendation to convince the user that the recommendation is relevant. This could be manifested in search results, browsing results, recommendation results, when the user gets more details about a result, or any combination. An example of illustrating a specific statistic is to discuss specific entities where the entity is referenced. To make this example more concrete, statistics about how many users have mentioned an entity (for overall popularity), or have mentioned an entity in the last week (for trending topics), may be presented to the user. While this could be for just a single service, such as the conversation in Facebook® status updates, this could also be presented in an aggregated form across multiple services such as discussion on both Facebook® and Twitter®, or across many blogs or news articles. It may also be filtered to make the results more relevant, for instance by only showing these statistics by a user's Facebook® friends. These messages may also be segmented depending on the types of discussion, for instance by reviews, check-ins, and messages.

After a set of results have been determined, the system may allow for the user to explicitly filter or sort results based on criteria such as 1) popularity, 2) personalization, 3) social relevancy, 4) expertise, 5) time of day, or 6) location. The system may learn how to automatically sort and filter results by observing user behavior, automatically biasing toward the type of results the user most typically relies upon. This sorting and filtering may occur both before a search is sent to a system (for example, automatically formulating and/or modifying a query to narrow the search), or after the fact by a user to refine results. While the user makes these changes, it is also possible to have the client re-order the results, without re-requesting results from the server, possibly by sending more results than are rendered initially to the user. For example, if the user indicates the user would like to see more results like result Y, then additional results of that type that were sent to the client but not displayed initially would be displayed.

In addition to conventional list-based recommendations as illustrated in FIG. 8, personalized recommendations system also provide results that feel more organic. As illustrated in FIG. 7, personalized recommendations system may show different shaped containers of recommendations. The layout, number, and types of each set of recommendations may vary each time. These different presentations of recommendations are particularly relevant in conjunction with interactions on touch-driven interfaces, such as those for an iPhone® or Android® device. For example, with the rectangular block layout in FIG. 7, the user could interact with each rectangle as if it were a physical block that may be dragged across the screen, possibly interacting with other blocks. Other layouts may mimic the interaction that the image displayed on the screen represents. For example, showing a movie poster to represent a movie recommendation, which may be interacted with like a piece of paper, dragging it around the screen. As an extension of this concept, physical interactions may be layered on-top, including 1) blowing on the device to make the recommendations flutter away like leaves, 2) crinkling or tearing a recommendation that a user doesn't like, 3) shaking the application to get new recommendations, 4) swiping a result or set of results off that the user doesn't like, 5) tapping a result to get more information, 6) holding the finger down to get more information about an entity (for instance with a rollover effect or adding more menu options) 7) swiping a result to a nearby user. The application may also provide the ability to explore recommendations, for instance by searching for recommendations that are similar or different from a specific entity.

Depending on the type of recommendation, a user might be alerted to take action. The system may vary the invasiveness of an alert for a recommendation based on factors such as 1) the relevancy 2) a limited number or 3) a relevant deadline to use the recommendation. Different levels of invasiveness take the forms such as 1) in-app/on-web real-time notifications, 2) emails, 3) text messages, 4) phone calls, 5) instant messages, 6) integrations with other third-party products, 7) a message or notification when a user returns to an app, 8) a result surfaced based on a specific search. The time-sensitive alerts may be coupled with messages on why the user should act now involving concepts such as 1) limited number, 2) recommendation expiration, or 3) a relevant individual desiring to partake in the recommendation with a user.

The system may enable users to get a recommendation for something in the future, and may enable the user to share this with one or many social connections, for instance a friend on Facebook®. In turn, the social connection may provide feedback about the recommendation, all of which may be fed into a personalization engine. For a physical location, this might be a request to share the experience with the person, or to tell the system they will be going to a physical location, such that their friends may join them, but with no specific friend in mind. Such systems could recommend potential users to share the experience with.

Once recommendations have been made, a user might tell other people, who may not be users, about the experience they might have in the future, or are having in real-time. In addition to a conventional individual check-in, where a user publishes that they are attending an experience, in various embodiments personalized recommendations system also support group check-ins, where users may as a group, all participate in publishing that they are at a specific location to a social network or some other service. In addition to simultaneously publishing the fact, they may associate messages with their check-in describing the experience, and their thoughts or other sentiment about it, possibly associating other metadata. These check-ins may appear in a disjointed fashion, for instance in everyone's Facebook® newsfeed, or could appear in an aggregated fashion, where a single user leads the check-in (on Facebook® this would be a status update), and other people's check-ins are comments or likes on the check-in.

There are many mechanisms for understanding who should be associated with a check-in automatically, using information such as GPS signal on a mobile device, and knowledge of the social graph of the individuals involved, through services such as Facebook®. In addition, physical interactions may be associated with a group check-in. For example, users could do a group check-in by all mimicking the motion of users making a toast with glasses of beer using their phone. They would achieve this by moving their phones toward the center of a circle, triggering an accelerometer hit on a phone. There are many other motions that could achieve this such as mimicking a high-five motion.

These physical gestures, may interact with many different sensors, perhaps even simultaneous interactions, including but not limited to the accelerometers, gyroscopes, the cameras, and microphones. The applications of these gestures could be applied to other mechanisms beyond group check-ins, such as requesting a new set of recommendations, performing an individual check-in, transmitting a message to a service like Facebook®, transmitting a SMS to a friend, or sending a recommendation to a friend. An example of a gesture to refresh results would be by shaking the phone. An example of a way to transmit a recommendation to a nearby friend would be by mimicking the lobbing of a ball, where the user holds their phone and "lobs" the recommendation to a nearby friend.

In embodiments of the invention, an entity associated with a recommendation may be a venue, defined to be any event, activity, or function, whether recurring or one-off, at a specific location. The venue may wish to run a promotion or advertisement for a physical place, the entire pipeline of inputting the location of a venue, to selecting an ad campaign, to monitoring an ad campaign's performance, to paying for an advertising campaign, may all take entity on a smart-phone. The user may denote the location in many ways including but not limited to 1) explicitly indicating some location within the venue, possibly using a mechanism such as GPS, 2) explicitly telling the system the exact boundaries of the establishment, possibly using a mechanism such as GPS, or 3) cross referencing a GPS location with a previously known list of locations nearby. The user responsible for the venue could also use an in-app application to run advertisements and deals, to attract clientele. These advertisements may or may not be configured to specify the desire to have the users appear 1) in real-time, 2) for a future time, or 3) with no time in mind.

The system could select the users, and find the proper incentives, including options such as deals and discounts, explicitly chosen by the venue, provide suggestions for the venue to accept, or automatically optimize the selection with no restaurant intervention. For example, if a restaurant owner is having a lull in customers, and wants 6 more users come to my pizza shop, the owner might be willing to pay for an ad to get users to show up right away, and may also be willing to provide a $1.00 off pizza discount. In some embodiments, the owner would use a mobile phone application or website to make this request in real time. The owner could then check back 5 minutes later, and see that 4 users have redeemed the coupons, which will expire within 20 minutes, so the owner knows that users will be in the shop promptly. The cost of running the advertisement might automatically be added to the restaurant owner's bill by the personalized recommendations system.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Further embodiments may be envisioned to one of ordinary skill in the art after reading this disclosure. In other embodiments, combinations or sub-combinations of the above disclosed invention may be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A computer-implemented method for providing personalized recommendation results for a target user based at least on stored data about the target user, comprising:
   obtaining, at a server computer, a plurality of feedback data items from a plurality of user mobile devices, wherein the plurality of feedback data items comprise:
      an indication of a high quality photo with a type,
      a response to the high quality photo obtained from a user mobile device of the plurality of user mobile devices, and
      at least one demographic data element associated with a user of the user mobile device;
   storing the plurality of feedback data items in a feedback database, wherein the feedback database is searchable by high quality photos;
   determining, by an engine executing on the server computer, a set of personalized recommendation results for a target user mobile device, based at least on the stored data about the target user of the target user mobile device and feedback data related to the target user;
   identifying, by the server computer, high quality photos to potentially provide to the target user mobile device in connection with the set of personalized recommendation results including a plurality of high quality photos that are associated with a particular recommendation result of the set of personalized recommendation results;
   by the server computer, filtering the identified high quality photos to form a set of personalized high quality photos that are to be provided to the target user mobile device, wherein the filtering comprises:
      identifying, a set of one or more demographic data elements associated with the target user of the target user mobile device;
      determining, from the plurality of feedback data items, a particular type of photo that elicits a desired response from a plurality of other users associated with that set of one or more demographic data elements; and
      in response to determining the particular type of photo, selecting, to display in association with the particular recommendation result, a particular high quality photo from the plurality of high quality photos associated with the particular recommendation result based on feedback data items of the plurality of other users all having demographic data elements that are aligned with the set of one or more demographic data elements associated with the target user of the target user mobile device;
   providing, by the server computer to the target user mobile device:
      the set of personalized recommendation results including the particular recommendation result,
      the set of personalized high quality photos including the particular high quality photo; and
      a particular message relating to the particular recommendation result;
   receiving, from the target user mobile device, a particular response to the provided set of personalized high quality photos, the particular response comprising a click on the set of personalized high quality photos displayed on the target user mobile device; and
   creating one or more additional feedback data items from the received click based on observed user behavior.

2. The method of claim 1, wherein the set of personalized recommendation results are for entities, comprising venues, merchants, media, products, and/or service providers.

3. The method of claim 1, wherein each recommendation in the set of personalized recommendation results corresponds to a respective high quality photo.

4. The method of claim 3, wherein the desired response is a click-through of the type of high quality photo.

5. The method of claim 3, wherein the desired response is a purchase, a visit to a website related to an entity, a visit to the entity, or a transaction related to the high quality photo.

6. The method of claim 3, wherein the high quality photos are arranged in a personalized layout, wherein the personalized layout is determined by a computer process that considers which layout of the high quality photos are associated with the desired response.

7. The method of claim 6, wherein the personalized layout is displayed on a device, wherein the device comprises a touchscreen.

8. The method of claim 7, further comprising shaking the device displaying the personalized layout of the set of personalized high quality photos associated with the set personalized recommendation results refreshes the set of personalized recommendation results.

9. The method of claim 7, further comprising lobbing the device toward another user passes a personalized recommendation result for the target user to the other user.

10. The method of claim 7, further comprising blowing on the device removes the set of personalized recommendation results.

11. The method of claim 7, further comprising pressing and holding down on a high quality photo displayed on the device reveals more information related to a recommendation result associated with the high resolution image.

12. The method of claim 7, further comprising swiping a given personalized high quality photo associated with a given personalized recommendation towards another user mobile device to pass the personalized recommendation for the target user mobile device to the other user mobile device.

13. The method of claim 7, further comprising pulling two fingers together on the touchscreen to simulate crinkling a given high quality photo associated with a given personalized recommendation result to remove the given personalized recommendation result.

14. The method of claim 1, wherein at least some of the feedback data items have an associated location, where the associated location represents an entity that provides a venue, goods, and/or services for which the feedback data item pertains, the method further comprising:
   identifying at least a suggested location from raw feedback data;
   mapping the suggested location to a known, enumerated location associated with an entity in an entity database, thereby canonicalizing locations and canonicalizing entities associated with the raw feedback data; and
   using a canonicalized location or canonicalized entity when identifying high quality photos to potentially provide to the target user mobile device.

15. The method of claim 14, further comprising:
   creating a personal profile for the target user of the target user mobile device based on at least stored data about the target user and a feedback data item related to the target user;
   determining, from raw feedback data used to generate the feedback data item, a feedback message;
   identifying, by the server computer, a sentiment response to the canonicalized location or canonicalized entity from the feedback data item, wherein the identifying is determined by a computer process that interprets the feedback message;
   updating the personal profile of the target user based on the sentiment response;
   updating the entity database based on the sentiment response; and
   using the updated personal profile when determining the set of personalized recommendation results for the target user mobile device.

16. The method of claim 15, wherein the target user is a primary user, the method further comprising:
   analyzing, at the server computer, the personal profile of the primary user and a personal profile of at least one or more secondary users;
   cross-referencing, at the server computer, the personal profile of the primary user, with the personal profiles of the at least one or more secondary users;
   determining a relationship between the primary user and the at least one or more secondary users;
   determining a group relevance based on the relationship between the primary user and the at least one or more secondary users;
   determining, by the server computer, a set of group personalized recommendation results for the primary user and the at least one or more secondary users, based at least on stored data about the primary user, stored data about the at least one or more secondary users, the plurality of feedback data items related to the primary user, and feedback data related to the at least one or more secondary users;
   identifying, by the server computer, group high quality photos to potentially provide to the target user mobile device in connection with the set of group personalized recommendation results;
   selecting or filtering the identified high quality photos to form a set of group personalized high quality photos that are to be provided to the target user mobile device, wherein the selecting or filtering is determined by a computer process that considers which high quality photos are associated with the desired response of users having demographic data elements aligned with demographic data about the primary user and the at least one or more secondary users; and
   providing the set of group personalized recommendation results, including the set of group personalized high quality photos to the primary user and the at least one or more secondary users.

17. The method of claim 16, wherein the set of group personalized high quality photos and the set of group personalized recommendation results for the primary user are based on the updated profile of a secondary user.

18. The method of claim 16, further comprising providing a set of personalized summaries to the target user mobile device, wherein each personalized summary in the set is related to a corresponding high quality photo and a corresponding personalized recommendation result in the set of personalized recommendation results, wherein each personalized summary in the set of personalized summaries comprises summary content related to the corresponding personalized recommendation result.

19. The method of claim 18, wherein the summary content is determined by a computer process that considers what summary content is associated with the desired response.

20. The method of claim 19, wherein the set of personalized summaries comprises a set of personalized explanations to provide to the target user mobile device, to inform why the set of recommendation results are personalized to the target user.

21. The method of claim 20, wherein the set of personalized explanations to provide to the target user mobile device is based on the canonicalized location or canonicalized entity from the entity database.

22. The method of claim 19, wherein the summary content comprises the feedback data from the at least one or more secondary users associated with the primary user.

23. The method of claim 16, wherein the relationship between the primary user and the at least one or more secondary users is determined by a computer process that considers similarities in the feedback message of the primary user and the feedback messages of the at least one or more secondary users.

24. The method of claim 16, further comprising:
analyzing the feedback data related to the primary user and the feedback data related to the at least one or more secondary users;
identifying the associated location of the primary user and the associated locations of the at least one or more secondary users based on the feedback data related to the primary user and the feedback data related to the at least one or more secondary users, respectively; and
updating the relationship between the primary user and the at least one or more secondary users, wherein the relationship between the primary user and the at least one or more secondary users is updated by a computer process that determines whether the associated location of the primary user is in close proximity of the associated location of the at least one or more secondary users.

25. The method of claim 1, wherein the plurality of feedback data items include a set of feedback data items obtained from the target user mobile device to iteratively identify the set of personalized recommendation results for the target user mobile device.

26. The method of claim 25, further comprising:
using the feedback data items previously obtained and stored in the feedback database to create a feedback history of the target user;
analyzing the feedback history of the target user;
creating a feedback filter based on the feedback history; and
applying the feedback filter to filter the set of personalized recommendation results.

27. The method of claim 1, wherein the particular response further comprises a clickstream of clicks observed on the set of personalized high quality photos displayed on the target user mobile device.

28. A system for providing personalized recommendation results for a target user based at least on stored data about the target user, the system comprising a server computer comprising a process and a computer readable medium, the computer readable medium comprising code executable by the processor to perform a method, the method comprising:
obtaining, at a server computer, a plurality of feedback data items from a plurality of user mobile devices, wherein the plurality of feedback data items comprise:
an indication of a high quality photo,
a response to the high quality photo obtained from a user mobile device of the plurality of user mobile devices, and
at least one demographic data element associated with a user of the user mobile device;
storing the plurality of feedback data items in a feedback database, wherein the feedback database is searchable by high quality photos;
determining, by an engine executing on the server computer, a set of personalized recommendation results for a target user mobile device, based at least on the stored data about the target user of the target user mobile device and feedback data related to the target user;
identifying, by the server computer, high quality photos to potentially provide to the target user mobile device in connection with the set of personalized recommendation results including a plurality of high quality photos associated with a particular recommendation result of the set of personalized recommendation results;
by the server computer, filtering the identified high quality photos to form a set of personalized high quality photos that are to be provided to the target user mobile device, wherein the filtering comprises:
identifying, a set of one or more demographic data elements associated with the target user of the target user mobile device;
determining, from the plurality of feedback data items, a particular type of photo that elicits a desired response from a plurality of other users associated with that set of one or more demographic data elements;
in response to determining the particular type of photo, selecting, to display in association with the particular recommendation result, a particular high quality photo from the plurality of high quality photos associated with the particular recommendation result based on feedback of the plurality of other users all having demographic data elements that are aligned with the set of one or more demographic data elements associated with the target user of the target user mobile device; and
providing, from the server computer to the target user mobile device:
the set of personalized recommendation results including the particular recommendation result,
the set of personalized high quality photos including the particular high quality photo; and
a particular message relating to the particular recommendation result;
receiving, from the target user mobile device, a particular response to the provided set of personalized high quality photos, the particular response comprising a click on the set of personalized high quality photos displayed on the target user mobile device; and
creating one or more additional feedback data items from the received click based on observed user behavior.

29. The system of claim 28, wherein the set of personalized recommendation results are for entities, comprising venues, merchants, media, products, and/or service providers.

30. The system of claim 28, wherein each recommendation in the set of personalized recommendation results corresponds to a high quality photo in the set of personalized high quality photos.

31. The system of claim 30, wherein the desired response is a click-through of the high quality photo.

32. The system of claim 30, wherein the desired response is a purchase, a visit to a website related to an entity, a visit to the entity, or a transaction related to the high quality photo.

33. The system of claim 30, wherein the high quality photos are arranged in a personalized layout, wherein the personalized layout is determined by a computer process that considers which layout of the high quality photos are associated with the desired response.

34. The system of claim 33, further comprising a device displaying the personalized layout, wherein the device comprises a touchscreen.

35. The system of claim 34, wherein shaking the device displaying the personalized layout of the set of personalized high quality photos associated with the set personalized recommendation results refreshes the set of personalized recommendation results.

36. The system of claim 34, wherein lobbing the device toward another user passes a personalized recommendation for the target user to the other user.

37. The system of claim 34, wherein blowing on the device removes the set of personalized recommendation results.

38. The system of claim 34, wherein pressing and holding down on a given high quality photo displayed on the device reveals more information related to a given recommendation result associated with the high quality photo.

39. The system of claim 34, wherein pulling two fingers apart on the touchscreen simulates tearing a given high quality photo associated with a given personalized recommendation result to remove the given personalized recommendation result.

40. The system of claim 34, wherein swiping a personalized high quality photo associated with a personalized recommendation result on the touch screen towards another user mobile device passes the personalized recommendation for the target user mobile device to the other user mobile device.

41. The system of claim 34, wherein pulling two fingers together on the touchscreen simulates crinkling a given high quality photo associated with a personalized recommendation to remove the personalized recommendation.

42. The system of claim 28, wherein at least some of the feedback data items have an associated location, where the associated location represents an entity that provides a venue, goods, and/or services for which the feedback data item pertains, the method further comprising:
  identifying at least a suggested location from raw feedback data;
  mapping the suggested location to a known, enumerated location associated with an entity in an entity database, thereby canonicalizing locations and canonicalizing entities associated with the raw feedback data; and
  using a canonicalized location or canonicalized entity when identifying high quality photos to potentially provide to the target user mobile device.

43. The system of claim 42, the method further comprising:
  creating a personal profile for the target user of the target user mobile device based on at least stored data about the target user and a feedback data item related to the target user;
  determining, from raw feedback data used to generate the feedback data item, a feedback message;
  identifying, by the server computer, a sentiment response to the canonicalized location or canonicalized entity from the feedback data item, wherein the identifying is determined by a computer process that interprets the feedback message;
  updating the personal profile of the target user based on the sentiment response;
  updating the entity database based on the sentiment response; and
  using the updated personal profile when determining the set of personalized recommendation results to potentially provide to the target user mobile device.

44. The system of claim 43, wherein the target user is a primary user, the method further comprising:
  analyzing, at the server computer, the personal profile of the primary user and a personal profile of at least one or more secondary users;
  cross-referencing, at the server computer, the personal profile of the primary user, with the personal profiles of the at least one or more secondary users;
  determining a relationship between the primary user and the at least one or more secondary users;
  determining a group relevance based on the relationship between the primary user and the at least one or more secondary users;
  determining, by the server computer, a set of group personalized recommendation results for the primary user and the at least one or more secondary users, based at least on stored data about the primary user, stored data about the at least one or more secondary users, feedback data related to the primary user, and the feedback data related to the at least one or more secondary users;
  identifying, by the server computer, group high quality photos to potentially provide to the target user mobile device in connection with the set of group personalized recommendation results;
  selecting or filtering the identified high quality photos form a set of group personalized high quality photos that are to be provided to the target user mobile device, wherein the selecting or filtering is determined by a computer process that considers which high quality photos are associated with the desired response of users having demographic data elements aligned with demographic data about the primary user and the at least one or more secondary users; and
  providing the set of group personalized recommendation results, including the set of group personalized high quality photos to the primary user and the at least one or more secondary users.

45. The system of claim 44, wherein the set of group personalized high quality photos and the set of group personalized recommendation results for the primary user are based on the updated profile of a secondary user.

46. The system of claim 44, the method further comprising providing a set of personalized summaries to the target user mobile device, wherein each personalized summary in the set is related to a corresponding personalized high quality photos and a corresponding personalized recommendation result in the set of personalized recommendation results, wherein each personalized summary in the set of personalized summaries comprises summary content related to the corresponding personalized recommendation result.

47. The system of claim 46, wherein the summary content is determined by a computer process that considers what summary content is associated with the desired response.

48. The system of claim 47, wherein the set of personalized summaries comprises a set of personalized explanations to provide to the target user mobile device, to inform why the set of recommendation results are personalized to the target user.

49. The system of claim 48, wherein the set of personalized explanations to provide to the target user mobile device is based on the canonicalized location or canonicalized entity from the entity database.

50. The system of claim 47, wherein the summary content comprises the feedback data from the at least one or more secondary users associated with the primary user.

51. The system of claim 44, wherein the relationship between the primary user and the at least one or more secondary users is determined by a computer process that considers similarities in the feedback message of the primary user and the feedback messages of the at least one or more secondary users.

52. The system of claim 44, the method further comprising:
analyzing the plurality of feedback data related to the primary user and the feedback data related to the at least one or more secondary users;
identifying the associated location of the primary user and the associated locations of the at least one or more secondary users based on the plurality of feedback data related to the primary user and the feedback data related to the at least one or more secondary users, respectively; and
updating the relationship between the primary user and the at least one or more secondary users, wherein the relationship between the primary user and the at least one or more secondary users is updated by a computer process that determines whether the associated location of the primary user is in close proximity of the associated location of the at least one or more secondary users.

53. The system of claim 28, wherein the plurality of feedback data items include a set of feedback data items obtained from the target user mobile device to iteratively identify the set of personalized recommendation results for the target user mobile device.

54. The system of claim 53, the method further comprising:
using the plurality of feedback data items previously obtained and stored in the feedback database to create a feedback history of the target user;
analyzing the feedback history of the target user;
creating a feedback filter based on the feedback history; and
applying the feedback filter to filter the set of personalized recommendation results.

55. The system of claim 28, wherein the particular response further comprises a clickstream of clicks observed on the set of personalized high quality photos displayed on the target user mobile device.

* * * * *